United States Patent
Harkness

(10) Patent No.: US 10,255,821 B2
(45) Date of Patent: *Apr. 9, 2019

(54) DRIVER TRAINING

(71) Applicant: LIFE LONG DRIVER, LLC, Incline Village, NV (US)

(72) Inventor: Richard Harkness, Incline Village, NV (US)

(73) Assignee: Life Long Driver, LLC, Incline Village, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/991,642

(22) Filed: May 29, 2018

(65) Prior Publication Data

US 2018/0277011 A1    Sep. 27, 2018

Related U.S. Application Data

(63) Continuation of application No. 15/298,101, filed on Oct. 19, 2016, now Pat. No. 10,013,893, which is a continuation-in-part of application No. 15/096,959, filed on Apr. 12, 2016, now Pat. No. 9,501,947, which is a continuation of application No. 13/286,210, filed on Oct. 31, 2011, now Pat. No. 9,349,300.

(51) Int. Cl.
| | |
|---|---|
| G09B 9/052 | (2006.01) |
| G09B 9/05 | (2006.01) |
| G09B 9/00 | (2006.01) |
| G09B 9/02 | (2006.01) |
| G09B 9/04 | (2006.01) |

(52) U.S. Cl.
CPC .............. *G09B 9/052* (2013.01); *G09B 9/00* (2013.01); *G09B 9/02* (2013.01); *G09B 9/04* (2013.01); *G09B 9/05* (2013.01)

(58) Field of Classification Search
CPC ... G09B 9/05; G09B 9/02; G09B 9/04; G09B 19/16; G09B 19/167; G09B 9/00; G09B 9/052; G09B 19/00

See application file for complete search history.

(56) References Cited

U.S. PATENT DOCUMENTS

| | | |
|---|---|---|
| 3,777,413 A | 12/1973 | Zaccheo |
| 3,916,534 A | 11/1975 | Riccio |
| (Continued) | | |

OTHER PUBLICATIONS

"How is teenSMART Different?" teenSMART, http://www.teensmartdriving.com/how/, Available May 9, 2014, 3 pages.

(Continued)

*Primary Examiner* — Jerry-Daryl Fletcher
(74) *Attorney, Agent, or Firm* — Amin, Turocy & Watson, LLP

(57) ABSTRACT

A driver training system for presenting a user of the system with simultaneous representation of a driving environment directed to four active visual zones comprising a driver's forward view, rear mirror view, and respective left and right side mirror views; for displaying a traffic hazard one of the four active visual zones; receiving an input from a user of the driving simulator identifying a location in one of the four active visual zones; determining if the location corresponds to the traffic hazard; and determining a response time between the display of the traffic hazard and the receipt of the input from the user.

12 Claims, 18 Drawing Sheets

(56) References Cited

U.S. PATENT DOCUMENTS

| | | | |
|---|---|---|---|
| 4,486,180 A | 12/1984 | Riley | |
| 4,500,868 A | 2/1985 | Tokitsu et al. | |
| 4,750,888 A | 6/1988 | Allard et al. | |
| 4,814,896 A | 3/1989 | Heitzman et al. | |
| 4,846,686 A | 7/1989 | Adams | |
| 4,868,771 A | 9/1989 | Quick et al. | |
| 4,939,587 A | 7/1990 | Deslypper | |
| 4,952,152 A | 8/1990 | Briggs et al. | |
| 5,131,848 A | 7/1992 | Adams | |
| 5,184,956 A | 2/1993 | Langlais et al. | |
| 5,187,571 A | 2/1993 | Braun et al. | |
| 5,209,662 A | 5/1993 | Fujita et al. | |
| 5,253,107 A | 10/1993 | Smith | |
| 5,275,565 A | 1/1994 | Moncrief | |
| 5,344,324 A | 9/1994 | O'Donnell et al. | |
| 5,350,179 A | 9/1994 | Hill et al. | |
| 5,366,376 A | 11/1994 | Copperman et al. | |
| 5,474,453 A | 12/1995 | Copperman | |
| 5,486,112 A | 1/1996 | Troudet et al. | |
| 5,499,182 A | 3/1996 | Ousborne | |
| 5,613,032 A | 3/1997 | Cruz et al. | |
| 5,652,717 A | 7/1997 | Miller et al. | |
| 5,660,547 A | 8/1997 | Copperman | |
| 5,807,114 A | 9/1998 | Hodges et al. | |
| 5,813,863 A | 9/1998 | Sloane et al. | |
| 5,828,943 A | 10/1998 | Brown | |
| 5,888,074 A | 3/1999 | Staplin et al. | |
| 5,919,046 A | 7/1999 | Hull | |
| 5,954,510 A | 9/1999 | Merrill et al. | |
| 6,227,862 B1 | 5/2001 | Harkness | |
| 6,632,174 B1 | 10/2003 | Breznitz | |
| 6,927,694 B1 | 8/2005 | Smith et al. | |
| 8,323,025 B2 | 12/2012 | Freund et al. | |
| 8,576,286 B1 | 11/2013 | Childs | |
| 8,597,027 B2 | 12/2013 | Staplin | |
| 8,598,977 B2 | 12/2013 | Maalouf et al. | |
| 2007/0015117 A1 | 1/2007 | Freund et al. | |
| 2007/0072154 A1 | 3/2007 | Akatsuka et al. | |
| 2007/0081262 A1 | 4/2007 | Oizumi et al. | |
| 2008/0108022 A1 | 5/2008 | Freund | |
| 2009/0011389 A1 | 1/2009 | Sizov | |
| 2009/0181349 A1 | 7/2009 | Harkness | |
| 2011/0076649 A1 | 3/2011 | Best et al. | |
| 2011/0076650 A1 | 3/2011 | Best | |
| 2015/0104757 A1 | 4/2015 | Moncrief et al. | |

OTHER PUBLICATIONS

"teenSMART," Adept Driver, http://www.adeptdriver.com/products/teensmart/, Available May 9, 2014, 3 pages.

"What makes teenSMART successful?" teenSMART, http://www.teensmartdriving.com/what/, Available May 9, 2014, 3 pages.

"Why be a teenSMART Driver?" teenSMART, http://www.teensmartdriving.com/why/, Available May 9, 2014, 2 pages.

Berry, B., "Adept Driver Launches New Version of teenSMART to Kick Off National Distracted Driving Awareness Month," www.adeptdriver.com, Apr. 10, 2014, 2 pages.

International Search Report & Written Opinion for International Patent Application Serial No. PCT/US09/30765, dated Apr. 30, 2009, 6 pages.

Office Action for U.S. Appl. No. 11/972,512, dated Jul. 12, 2011, 17 pages.

Office Action for U.S. Appl. No.11/972,512, dated Nov. 13, 2014, 36 pages.

Office Action for U.S. Appl. No. 11/972,512, dated Jul. 6, 2015, 32 pages.

Office Action for U.S. Appl. No. 13/286,210, dated Nov. 19, 2014, 17 pages.

Office Action for U.S. Appl. No. 14/563,182, dated Apr. 9, 2015, 16 pages.

Office Action for U.S. Appl. No. 14/563,182, dated Jul. 8, 2015, 15 pages.

Office Action for U.S. Appl. No. 13/286,210, dated Jul. 23, 2015, 24 pages.

Notice of Allowance for U.S. Appl. No. 13/286,210, dated Jan. 13, 2016, 28 pages.

Office Action for U.S. Appl. No. 11/972,512, dated Jan. 12, 2016, 65 pages.

Pollatsek, A., et al., "Using Eye Movements to Evaluate a PC-Based Risk Awareness and Perception Training Program on a Driving Simulator," Human Factors, 2006, vol. 48, No. 3, pp. 447-464.

Office Action for U.S. Appl. No. 11/972,512, dated May 18, 2016, 50 pages.

Office Action for U.S. Appl. No. 15/096,959, dated Jun. 1, 2016, 24 pages.

Notice of Allowance for U.S. Appl. No. 15/096,959, dated Jul. 20, 2016, 21 pages.

Office Action for U.S. Appl. No. 14/563,182, dated Aug. 19, 2016, 29 pages.

Defensive Driving Strategies [online]. [retrieved on Aug. 8, 2016]. Retrieved from the Internet: URL: http://web.archive.org/web/20040804230200/http://www.webtrafficschool.com/wts/content!Florida/DefensiveDriving_Strategies.html (webtrafficschool.com) Published Aug. 4, 2004.

Office Action for U.S. Appl. No. 15/298,101, dated Aug. 7, 2017, 40 pages.

Office Action for U.S. Appl. No. 14/563,182, dated Feb. 28, 2017, 20 pages.

Office Action for U.S. Appl. No. 15/298,101, dated Dec. 27, 2017, 29 pages.

Office Action for U.S. Appl. No. 14/563,182, dated Nov. 22, 2017, 17 pages.

Final Office Action for U.S. Appl. No. 14/563,182 dated Jan. 24, 2019, 71 pages.

DRIVER TRAINING

CROSS-REFERENCE TO RELATED APPLICATIONS

This application is a continuation of and claims priority to U.S. patent application Ser. No. 15/298,101 titled "DRIVER TRAINING" and filed on Oct. 19, 2016 which is a continuation-in-part of and claims priority to U.S. patent application Ser. No. 15/096,959 titled "DRIVER TRAINING" and filed on Apr. 12, 2016, which claims priority to U.S. patent application Ser. No. 13/286,210 filed Oct. 31, 2011, and entitled "SENIOR DRIVER TRAINING," the disclosures of which are hereby incorporated herein by reference in their entirety.

BACKGROUND OF THE INVENTION

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

Field of the Invention

The present invention relates to systems and methods for assessing and training automobile drivers.

Description of Related Art

Tens of thousands of people die on U.S. roadways each year. The vast majority of fatal crashes can be tied to a human choice or error. The National Highway Traffic Safety Administration (NHTSA), American Association of Motor Vehicle Administrators (AAMVA), automobile manufactures, safety organizations and society in general are searching for technologies that will reduce the crash risk and improve quality of life and mobility.

Various techniques, systems and methods are available for providing driver education and training. Most driver training systems and methods employ actual, behind the wheel driver training as at least one component. Such driver training may or may not be supplemented with classroom instruction.

Also known are driving simulators in which images are displayed on a display device. In such simulators a steering wheel, brake and accelerator are typically connected in a feedback loop and under computer control the image displayed varies as a function of the driver's operation those components. Additional views, such as left side views, right side views and rear views may be provided within separate windows on the display device, or using separate display devices for views in addition to views simulating a forward view.

In United States Patent Application No. 20090181349, a driver training system is presented in the form of a computerized assessment system is described for diagnosing driving skills in a driver of the class of vehicle drivers having impaired abilities, such as a senior driver. The system utilizes prerecorded audio/visual training sessions for diagnosing the visual cognition, visual memory and visual recall abilities of a motor vehicle driver with interactive driving simulations presented through four active visual zones, representing a forward view, a rear view mirror view and the view representing both side view mirrors. That system was presented as providing a tool for rehabilitation of drivers having impaired abilities through visual cognition tests involves full motion driving simulations to assess visual search skills. Visual memory and visual recall of the senior driver are also assessed.

United States Patent Application No. 20100041001, discloses an attention training system that is said to improve driving skills in older citizens, by addressing the conditions of divided attention related to the Useful Field of View (UFOV). Reduced UFOV performance in older adults is said to be associated with poorer driving performance and more auto accidents. The positive consequences of the general UFOV training-induced performance improvement are said to include improved health-related quality of life outcomes and improved ability to perform activities of daily living. Participants are required to select a target image from among numerous candidate images. If the participant correctly selects the first target image, the participant is required to select the first peripheral location from the multiple peripheral locations. The presentation time is adaptively modified based on the correctness/incorrectness of the participant's selections. While the process is said to improve a participant's cognition, it does not present to the user an assessment that resembles a driving environment.

These and all other publications, patents and applications referenced below, are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

SUMMARY OF THE INVENTION

These and other features and advantages of this invention are described in, or are apparent from, the following detailed description of various exemplary embodiments of the apparatus and methods according to this invention.

A driver training system is disclosed that provides computerized means for presenting a user of the system with simultaneous images of a driving environment from four active visual zones comprising a driver's forward view, rear mirror view, and respective left and right side mirror views, where the forward view comprises a view comprising a view from a camera depicting the view from the windshield combined with a camera depicting the view from the driver's window. The system further uses computerized means for tracking the driving environment found within the two visual neutral zones comprising a driver's respective left and right blind spots, and computerized means for presenting a user with questions regarding events in the footage occurring within the four active visual zones and the two visual neutral zones. A database records responses to the questions.

In a further embodiment, the invention provides a system where the forward view provides a view of at least about 130 degrees of the driving environment within the driver's forward view.

In a further embodiment, the invention provides a system where the forward view further comprises a view depicting the view from the passenger's window.

In a further embodiment, the invention provides a system where the forward view provides a view of at least about 175 degrees of the driving environment within the driver's forward view.

In a further embodiment, the invention provides a system where the simulated driving session includes at least one presentation requiring the driver to act in response to a driving environment presenting a response required to a gap in the flow of traffic.

In a further embodiment, the invention provides a system where the time of the response is recorded and calibrated to safe, risky and unsafe scores.

In a further embodiment, the invention provides a system where the score of safe requires a simulated gap of four or more seconds for taking a left turn driver action across traffic.

In a further embodiment, the invention provides a system where the score of unsafe involves a simulated gap of less than three seconds for taking a left turn driver action.

In a further embodiment, the invention provides a system where the score of risky involves a simulated gap of between three and four seconds for taking a left turn driver action.

In a further embodiment, the invention provides a system where the flow of traffic comprises is that presented by a traffic circle environment.

In a further embodiment, the invention provides a system where the flow of traffic is that presented by a left turn into oncoming traffic.

In a further embodiment, the invention provides a system where the flow of traffic is that presented by a T-stop environment.

In a further embodiment, the invention provides a system where the flow of traffic is that presented by a merge onto a freeway.

In a further embodiment, the invention provides a system where the flow of traffic is that presented by a merge into an adjacent lane of traffic.

In a further embodiment, the invention provides a system where the forward view comprises a pannable view.

In a further embodiment, the invention provides a system where the pannable view may be manipulated by the user by means of a graphical user interface.

In a further embodiment, the invention provides a system where the graphical user interface shifts the pannable view left and right in response to the user's head motion.

In a further embodiment, the invention provides a system where the view pans automatically.

In a further embodiment, the invention provides a system where the driving environment presentation is variable in complexity.

In a further embodiment, the invention provides a system where the complexity varies depending on traffic density.

In a further embodiment, the invention provides a system where the complexity varies depending on traffic speed.

The invention also provides a driver training system comprising computerized means for providing a user of the system with a presentation of a driving environment recorded from cameras directed to four active visual zones comprising a driver's forward view, rear mirror view, and respective left and right side mirror views; computerized means for tracking activity within the four active visual zones and within two inactive zones representing respective driver blind spots; and computerized means for digitally assessing driver actions in response to simulated driving situations presented by the presentation; where the simulated driving situations requires the user to account for at least three targets within the four active visual zones and the two inactive zones.

In one embodiment, the up to fifteen targets are presented in an exercise presenting a series of gaps in traffic.

In a further embodiment, the invention provides a system where the computerized means assess the time of response for the driver actions.

In a further embodiment, the invention provides a system where the computerized means assess the accuracy of response for the driver actions.

In a further embodiment, the invention provides a system where the situation includes at least one presentation requiring the driver to identify a traffic hazard.

In a further embodiment, the invention provides a system where the situation involves the driver taking an action to identify an object of interest or potential hazard.

In a further embodiment, the invention provides a system where the object of interest or hazard is a traffic signal.

In a further embodiment, the invention provides a system where the object of interest or hazard is a pedestrian.

In a further embodiment, the invention provides a system where the object of interest or hazard is a vehicle.

These and other features and advantages of this invention are described in, or are apparent from, the following detailed description of various exemplary embodiments of the apparatus and methods according to this invention.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF THE INVENTION

The present invention provides a system and method for providing driver training and education.

Tens of thousands of people die on U.S. roadways each year. The vast majority of fatal crashes can be tied to a human choice or error. The National Highway Traffic Safety Administration (NHTSA), American Association of Motor Vehicle Administrators (AAMVA), automobile manufactures, safety organizations and society in general are searching for technologies that will reduce the crash risk and improve quality of life and mobility.

To achieve this, one embodiment uses seamless 360 degree cameras that capture the driving environment from the drivers' perspective. The accompanying psychometrics collect detailed "granular" data of the drivers' crash avoidance skills and performance including; visual cognition and memory, (Rapid Search™) hazard detection, risk perception, determining safe gaps in traffic when turning, navigating intersections or entering the road, following distance, escape route identification. Data from on board vehicle control systems or in-vehicle monitoring systems like "telematics" are shared with auto manufactures, insurance companies and other organizations to improve the crash reduction effectiveness of our training systems, and underwriting results, and driver use of Highly Automated Vehicle (HAV) technologies.

Based on studies, critical psychomotor, cognitive and sensory and perceptual content was identified as necessary for a program to provide effective behavioral intervention.

Driver Training

The present system utilizes the ability to present a more realistic driving presentation to the user to specifically train and assess the driver's abilities in concrete ways. The present systems and methods engage the learner in a fashion designed to maximize learning efficiency and increase driver retention of the learning's. The learning's are reinforced to impact behavioral change and habit formation in the driver.

In addition to the literature, driver focus groups were employed to evaluate and fine tune the instructional technology, computer functionality, key board and mouse functionality, etc., of the system. Two prototypes were built and tested and modified before final version psychometrics were initiated, during which period many enhancements were made.

Figure 1:
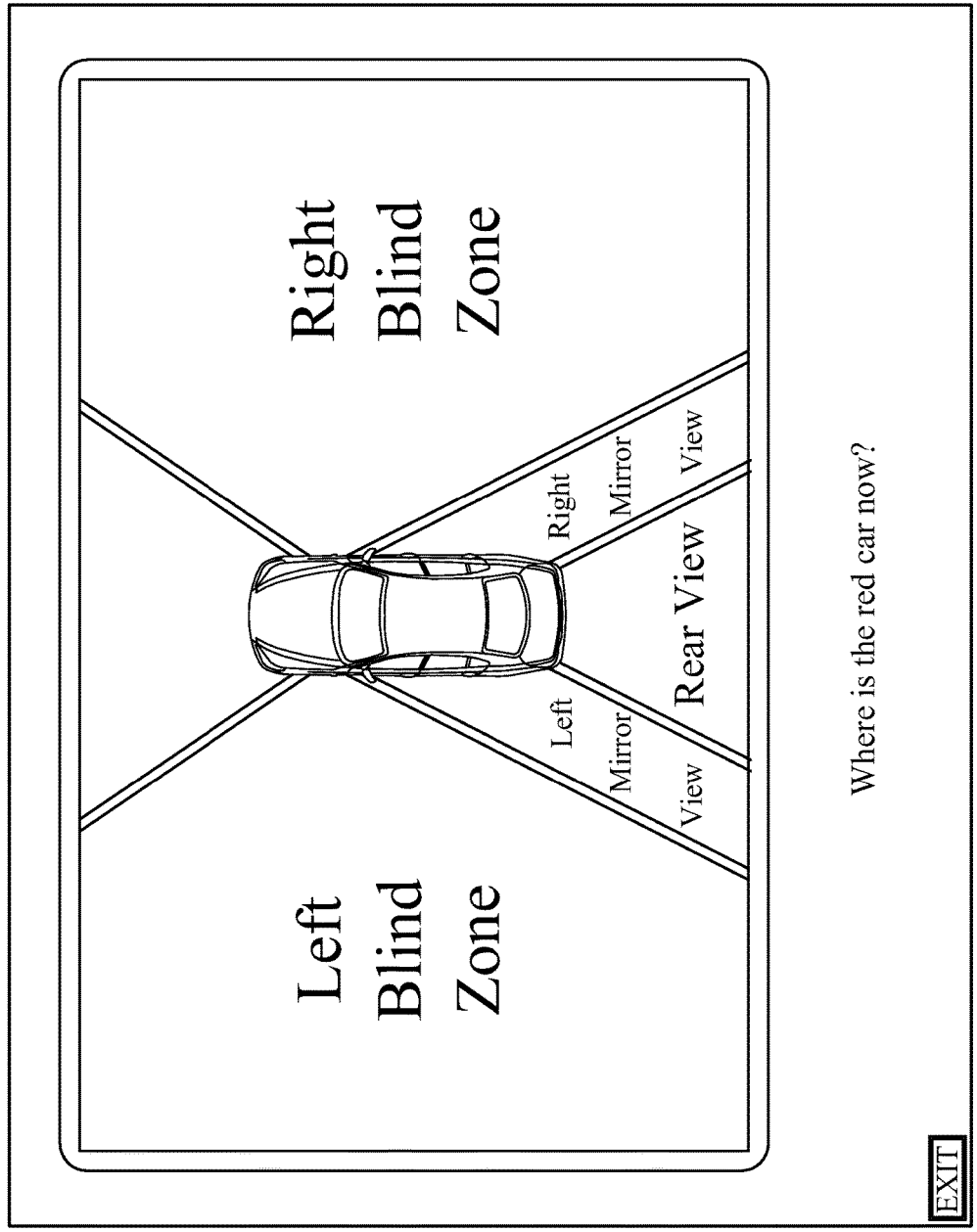
FIG. 1 is a diagram setting forth the components of a prior system for presenting four visual zones to a driver in a simulated driver assessment.
Figure 2:
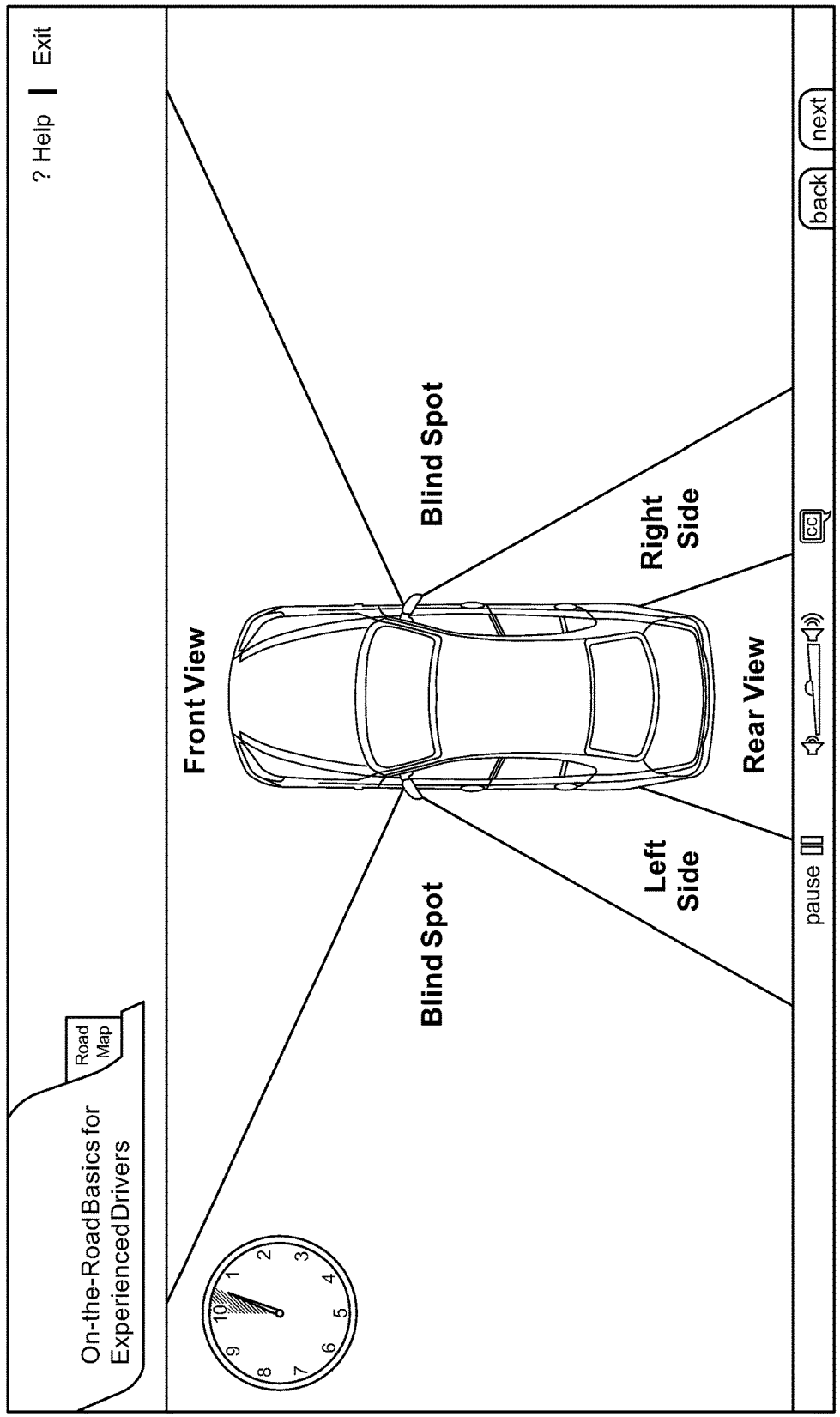
FIG. 2 is a diagram setting forth the extended components of the present system when using a two-camera stitch.
Figure 3:
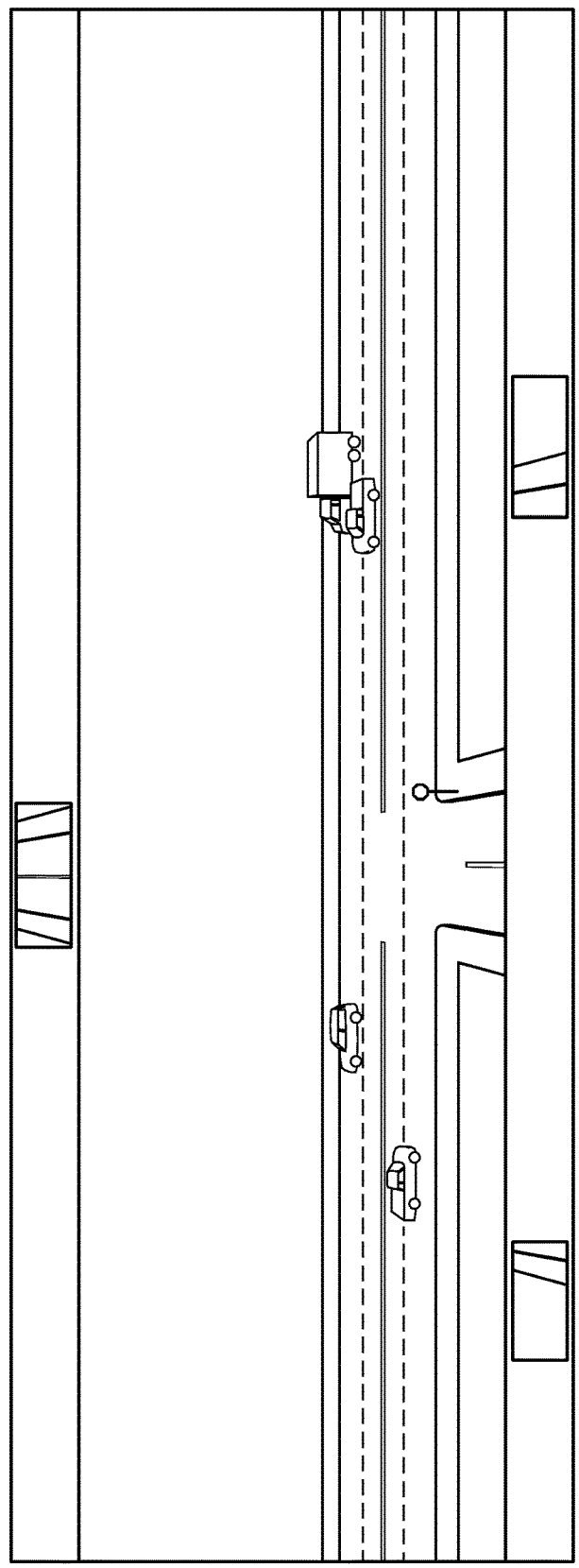
FIG. 3 shows a screen shot taken from a presentation made to the driver that is from a recorded driving situation, providing a 175 degree pannable field of view.

The system employs a new video capture technology of the driving environment, using high definition for clarity and contrast sensitivity assessments, as well as added response time assessments capable of measurements up to 1/30 of a second. The video capture technique uses up to three cameras to capture a front driver view with a nearly 180 degree field of vision. FIG. 1 is a diagram showing the components of a prior system that presented four visual zones to a driver in a simulated driver assessment. FIG. 2 shows the extended components of the present system based on technology that allows for seamless stitching of multiple camera images recorded from a front camera and side cameras directed to capture the driver and passenger window views. As depicted in FIG. 2, this provides an approximately 120 degree full motion combination front view, though adjustments to the cameras can be made to provide greater or lesser angled views, as deemed necessary for the exercise. Views approaching 180 degrees are about as great as are practically necessary for most simulations. FIG. 3 shows a screen shot taken from a presentation made to the driver that is from a recorded driving situation, providing a 175 degree pannable field of view.

The expanded field of view is necessary to present certain driving situations that are particularly important to training and assessment. The new techniques integrate high definition 6 camera images and compression, with three cameras stitching into a pannable front view, along with cameras for the two side mirrors and rear view mirror. Designing a graphic user interface that allow for the 6 camera functionality, in some ways similar to I-max surround video, allows a psychometric assessment of gap analysis, visual cognition and hazard detection/divided attention in driver education.

The resulting systems is able to record simultaneous footage of a driving environment from cameras directed to four active visual zones comprising a driver's forward view, rear mirror view, and respective left and right side mirror views, but where the forward view comprises a composite expanded view. The expanded view is developed from a camera depicting the view from the windshield combined with a camera depicting the view from the driver's window. In this expanded view, driving events can be evaluated and assessed that are not presentable from a recording from a single forward facing camera.

The system uses computerized means for tracking the driving environment found within the two visual neutral zones comprising a driver's respective left and right blind spots, and computerized means for presenting a user with situations from simulated driving environments.

The driver is finally presented with questions regarding events in the footage occurring within the four active visual zones and the two visual neutral zones. A database records responses, and response times, to the questions.

In every simulation, a driving simulation is played and then flashed to a graphic six zone screen that covers the driving scene.

Where the method also assesses hazard detection skills of the drivers, the simulated driving situation requires the user to account for at least three targets simultaneously for visual cognition and memory tests, although this may be adapted for different users and driving environments. One to three may be appropriate for some users for freeze frame visual cognition and memory tests within the four active visual zones and the two inactive zones. The test taker is presented a full motion driving scenario and clicks on to hazards as they appear during the driving scene. Typically, the test taker will have to respond in a timely manner to get credit on hazard identification. This test measure response times of the test taker as part of the assessment, measured digitally and timed by the system apparatus. Reaction times are something particularly critical to assessing the abilities of drivers to the simulated driving situations.

One to as many as twenty hazards may be presented, however, when assessing gap analysis against cross traffic or merging into flows of traffic.

For the driver, presenting a plurality of hazards is important, as the diminishment of the cognitive abilities of cognition, visual awareness and spatial memory are all utilized in tracking multiple objects and events in the driving environment, such as vehicles, pedestrians and traffic signals.

The system employs and utilizes various computerized means for presenting and recording the resulting actions of the driver. The system will include a computer program to present the at least one prerecorded audio/visual training session, with recording means for diagnosing the visual cognition, visual memory and visual recall abilities of a driver.

The four active visual zones will typically be presented to the driver by the use of computerized means for digitally assessing driver actions in response to simulated driving situations presented by the interactive driving simulations. Response times, accuracy, and the number of missed opportunities are all assessed and recorded.

A driving scene is typically presented showing the four fields in a split screen system on a computer screen, which is then stopped before switching to a zone graphic with a question. The visible zones in the four camera field of view include the expanded forward zone, which includes everything visible through a windshield in driving, and occupies the full computer screen except the spaces reserved for the three small rectangular shaped images that appear to have a chrome border.

A left side mirror zone is provided in a chrome framed rectangular image in the lower left hand corner of the screen. The right side mirror zone is a chrome-framed rectangular image in the lower right hand corner. A rear mirror zone is shown as a chrome framed rectangle in the upper center of the screen. Each mirror zone depicts its own scene simultaneously with the main screen windshield view.

The right blind spot zone is everything to the right of the car that cannot be seen in the front view, rear view or right side mirror zones. The left blind spot represents the zone to the left of the car that cannot be seen in the front view, rear view or left side mirror zones.

Objects are constantly moving in and out of these blind spots during the full motion video scenarios, just as in real world driving. The presentation of real world transitions among and between visible and blind spot zones permits a series of questions to be asked of the simulation driver. The driver at all times is expected to track and to know what is in the blind spots, and what is not there.

For example, if asked "Where is the white pickup truck now?" and the truck was slowly passing on the right and had just disappeared from the right rear mirror, the driver would respond; "in the right blind spot zone", even though the truck is not presently visible on the computer screen. Another possibility would be to ask the test taker "where is your escape path now?" If there had been no cars drifting in or out of the blind spot or right rear view mirror or ahead and immediately to the right then the driver could assume the right blind spot zone was clear and would most likely make for good escape path if needed at the moment.

The system may also be designed to assess the abilities of the driver relating to lateral search, risk perception, speed adjustment, space management, and hazard recognition.

As another feature of the method and system of driver assessment is the creation of a database that records driver actions. This database is used in developing a diagnostic assessment of the visual cognition, visual memory and visual recall abilities of the driver. Preferably, the system employs unobtrusive psychodiagnostic methods in the diagnostic assessment as part of the measurements taken of driver reactions and response times. Features built into the software make calculations that measure ability, progress and improvement, as well as allow for adaptive learning and artificial intelligence to occur.

Another computer program is employed that is capable of developing a diagnostic assessment of the visual cognition, visual memory and visual recall abilities of the driver based on the recorded driver actions.

The use of digital frame based technology allows precise timing and very accurate comparisons of reactions that are made by the driver to the simulations presented by the system, and digital frame based technology is preferred for use with the system. Current digital camera and digital motion technologies are capable capturing a minimum of 720 by 485 pixels of data per frame, and at 30 frames per second. Alternatively, more traditional streaming video can be used with the system.

Different environments and assessments are used to address the common issues seniors have in the timing of traffic actions, such as in crossing oncoming traffic, and merging. In this context the expanded forward camera is particularly important, as many of the situations that are most problematic to seniors are those that involve the timing of gaps in oncoming traffic. Many of these "gap analysis" situations occur with traffic passing toward and past the driver car from various angles. A panning option, or even auto panning functionality, is critical for such an evaluation. Presentations are shot in urban, suburban, rural driving environments, and are captured in varying lighting conditions, including, glaring, normal, dusk, shadowy, bright clear, rainy, diminished contrast sensitivity, enhanced contrast sensitivity, etc.

In the training system, the panning functionality is also linked to unique and proprietary computer software that measures real time responses and provides instant feedback to the user. This allows data tracking and reporting software to capture and report performance as well as competency for certification, for instance, to an insurance discount program.

In some cases the pannable view may be manipulated by the user by means of a graphical user interface, for instance, to shift a view left and right in response to the user's head motion. Alternatively, in other cases the view may be panned automatically for the driver.

Figure 4:
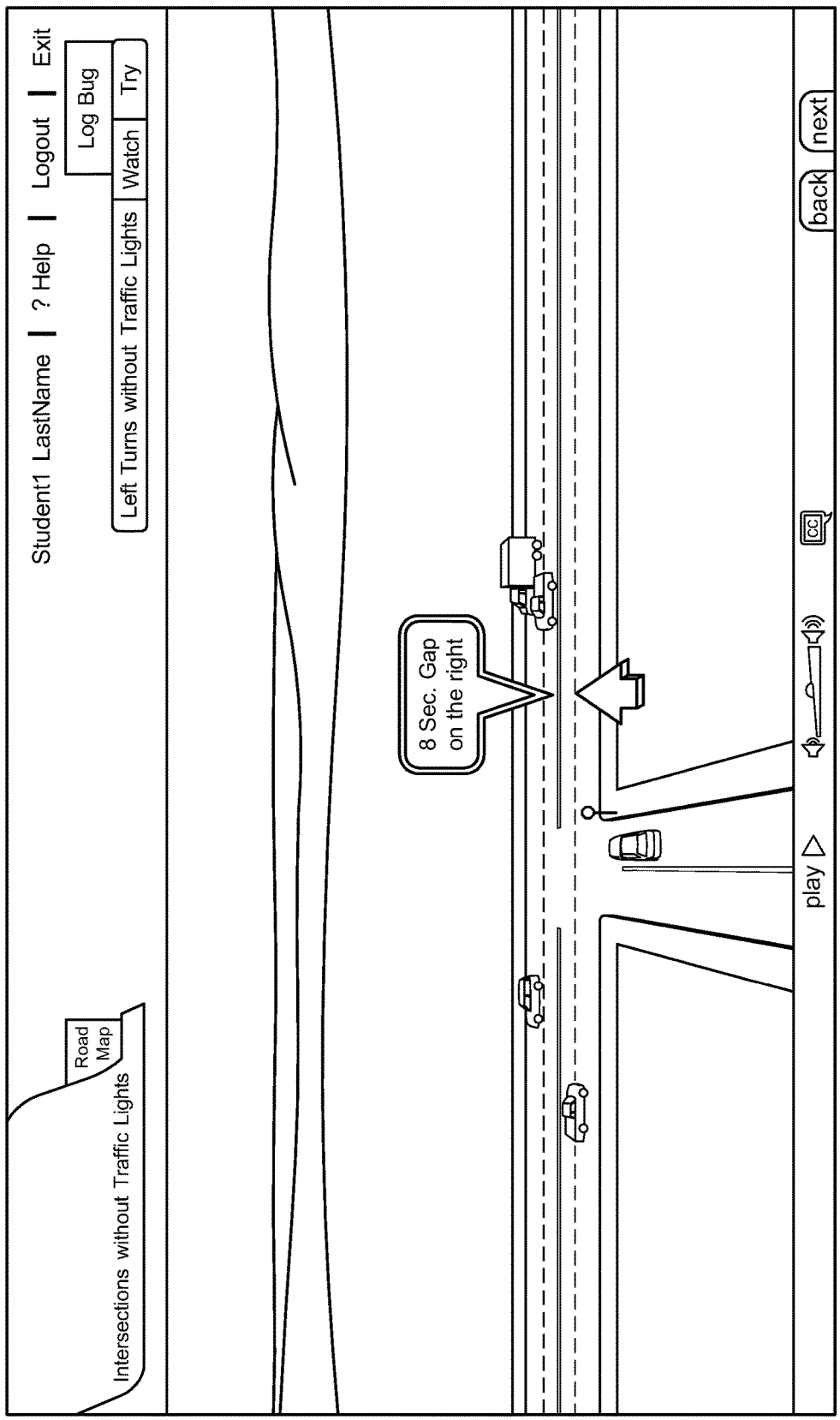
FIG. 4 is a screen shot showing a graphical demonstration of the safe six second gap required while addressing a left hand turn at a T intersection.

FIGS. 4 through 8 demonstrate an aspect of the new style of presentation adapted to teach a driver about safe turns while addressing a left hand turn across oncoming traffic at an uncontrolled intersection. FIG. 4 is a screen shot taken from an audio visual module that is used to demonstrate visually the six second gap that is required for safely making a left hand turn at a T intersection.

Figure 5:
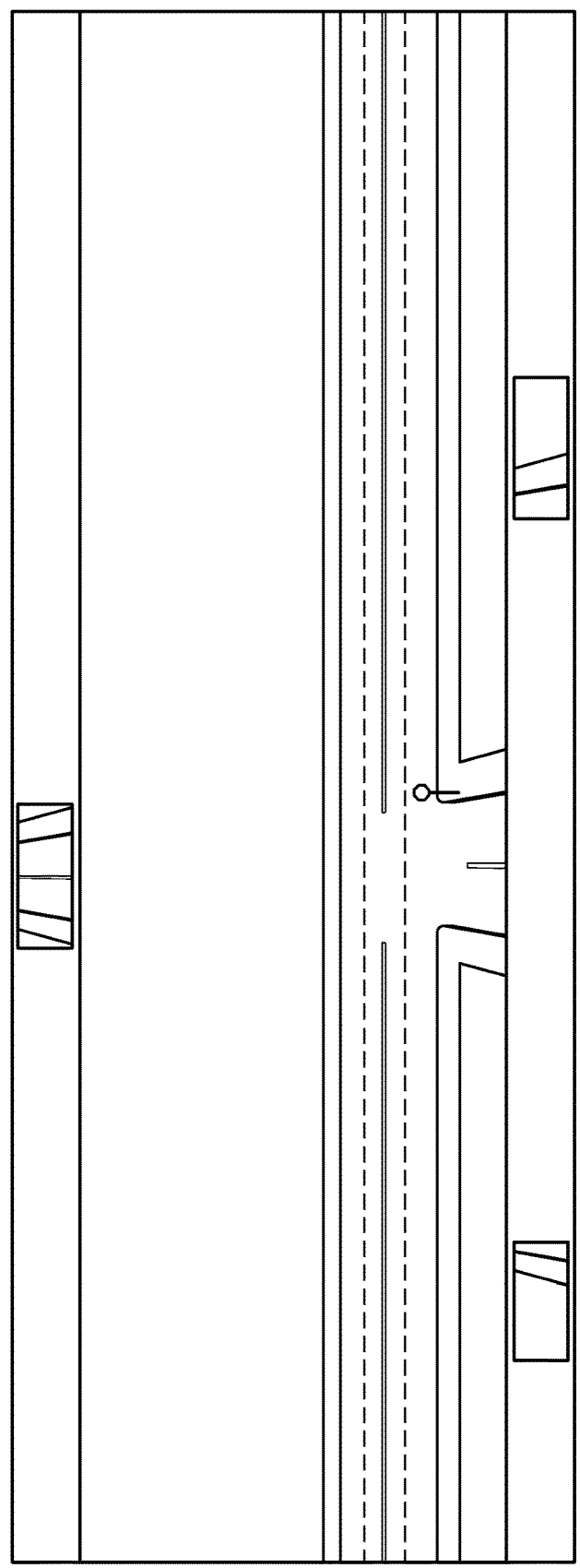
FIG. 5 shows a screen shot similar to that depicted in FIG. 3, providing a 175 degree pannable field of view, where the driving situation is associated with a safe opportunity for turning.

FIG. 5 shows a screen shot similar to that depicted in FIG. 3, providing a 175 degree pannable field of view, but in the example provided in FIG. 5, the driving situation is associated with an opportunity for turning at a T-type intersection that would be deemed safe. Within the field of view such as provided in FIG. 5, there is an opportunity to pan back and forth, to allow the driver to assess the entire driving environment for safe opportunities for turning.

Figure 6:
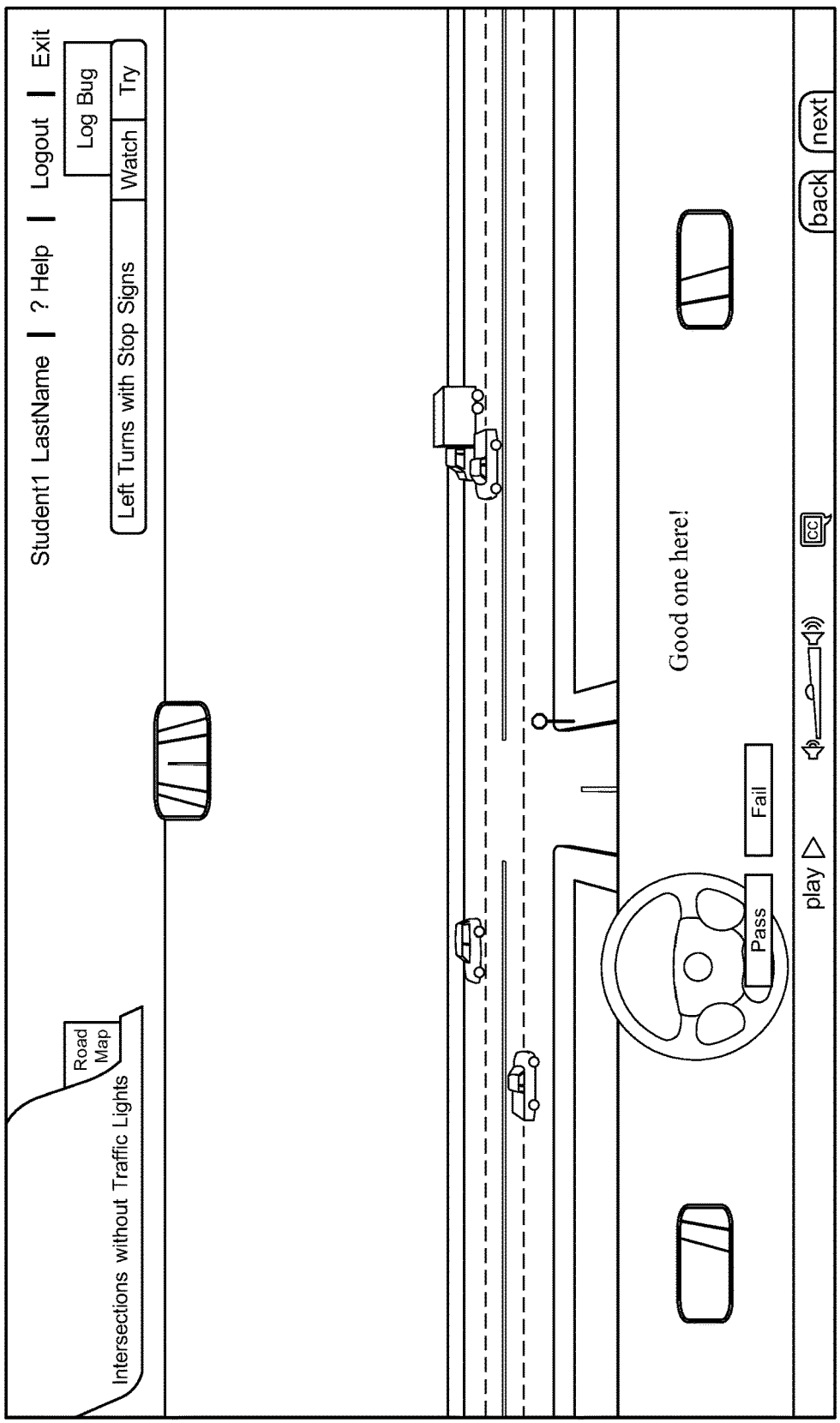
FIG. 6 is a screen shot taken from a presentation made to the driver that is from a recorded driving situation, showing a safe action.
Figure 7:
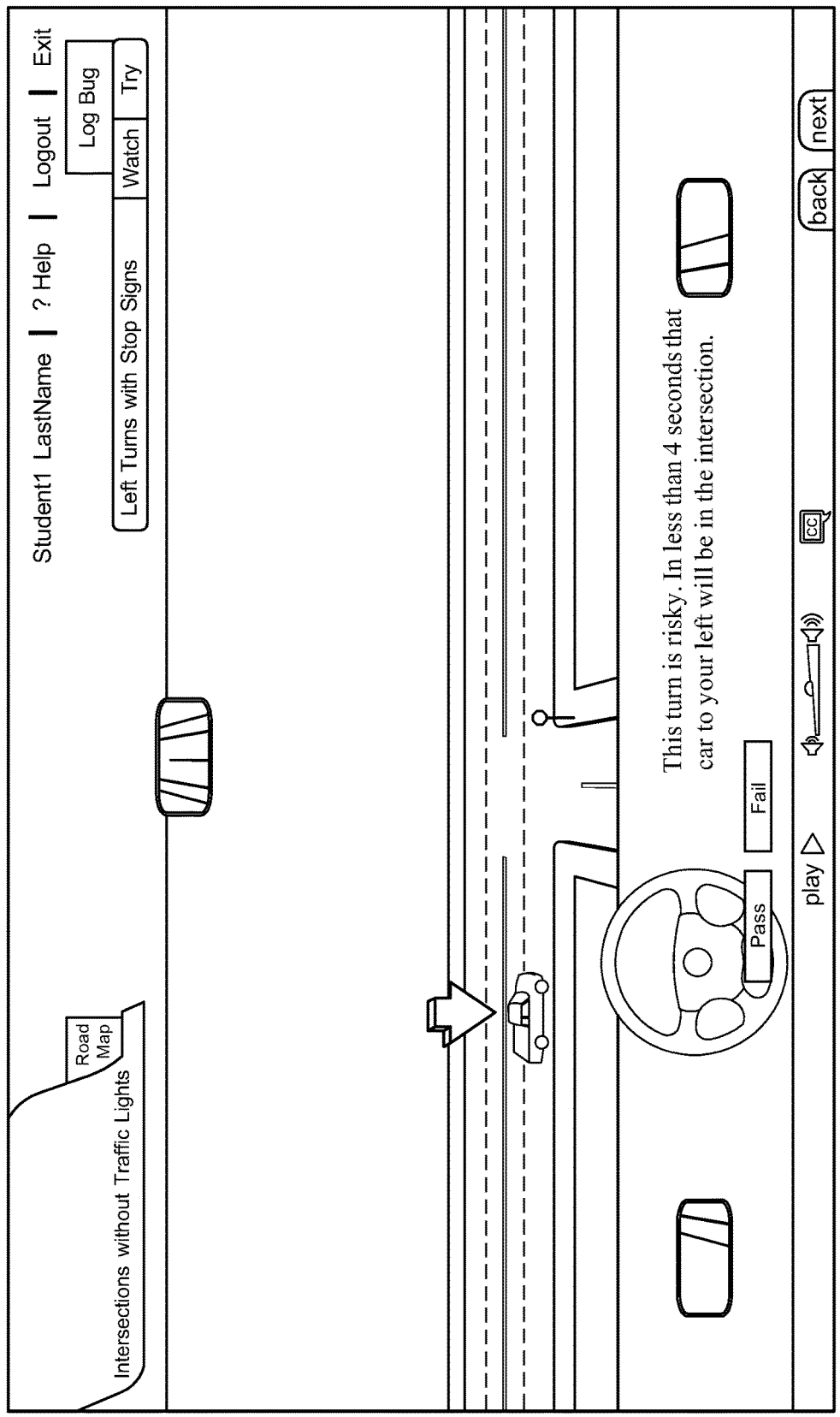
FIG. 7 is a screen shot taken from the same presentation as FIG. 4, only showing the result as a risky action.

FIGS. 6 and 7 demonstrate the pannable views available to the driver. FIGS. 6 and 7 are screen shots taken from a different unregulated turning situation than that in FIG. 5, and show how the presentation may be made to the driver from a recorded actual driving situation. FIGS. 6 through 7 are used in teaching the driver to accurately assess the gaps in both left and right hand oncoming traffic. The driver is presented with a pannable view of the entire intersection with traffic flowing from both the left and right directions. Gaps in the traffic are presented, and the driver must select the correct opportunities for making the left hand turn.

In assessing the results of gap analysis simulation, the time of the response is recorded and calibrated to safe, risky and unsafe scores. FIGS. 6 and 7, respectively, show screen shots demonstrating these results. For seniors, it has been determined that a score of safe requires a simulated gap of four or more seconds for taking a driver action into oncoming gaps, while a score of unsafe involves a simulated gap of less than three seconds for taking the same driver action. A risky score is assessed to an action taken through a simulated gap of between three and four seconds. The gap requirements for taking action to merge into traffic, such as a right hand turns, roundabouts, etc., is six or more seconds for taking a driver action into oncoming gaps, while a score of unsafe involves a simulated gap of less than five seconds for taking the same merging action.

The results are shown to the student, as seen in the margins of the screen shot, with scores of safe, unsafe, risky and missed all communicated immediately to the student. The system thus combines the student with actual driving situations and follows up with immediate feedback to the student regarding the appropriateness of the action taken.

In FIG. 6, the results are shown where the driver has made a correct determination, as the truck depicted in the figure has already passed the intersection from the right. FIG. 7 is the example of a risky turn, where the arrow to the left highlights the oncoming truck from the left that will enter the intersection in less than 4 seconds.

The driving environment presentations can be varied in complexity, such as for the traffic speed and density. The complexity may be varied within a session, or a driver may be advanced from sessions of lower complexity to session of higher complexity.

Figure 8:
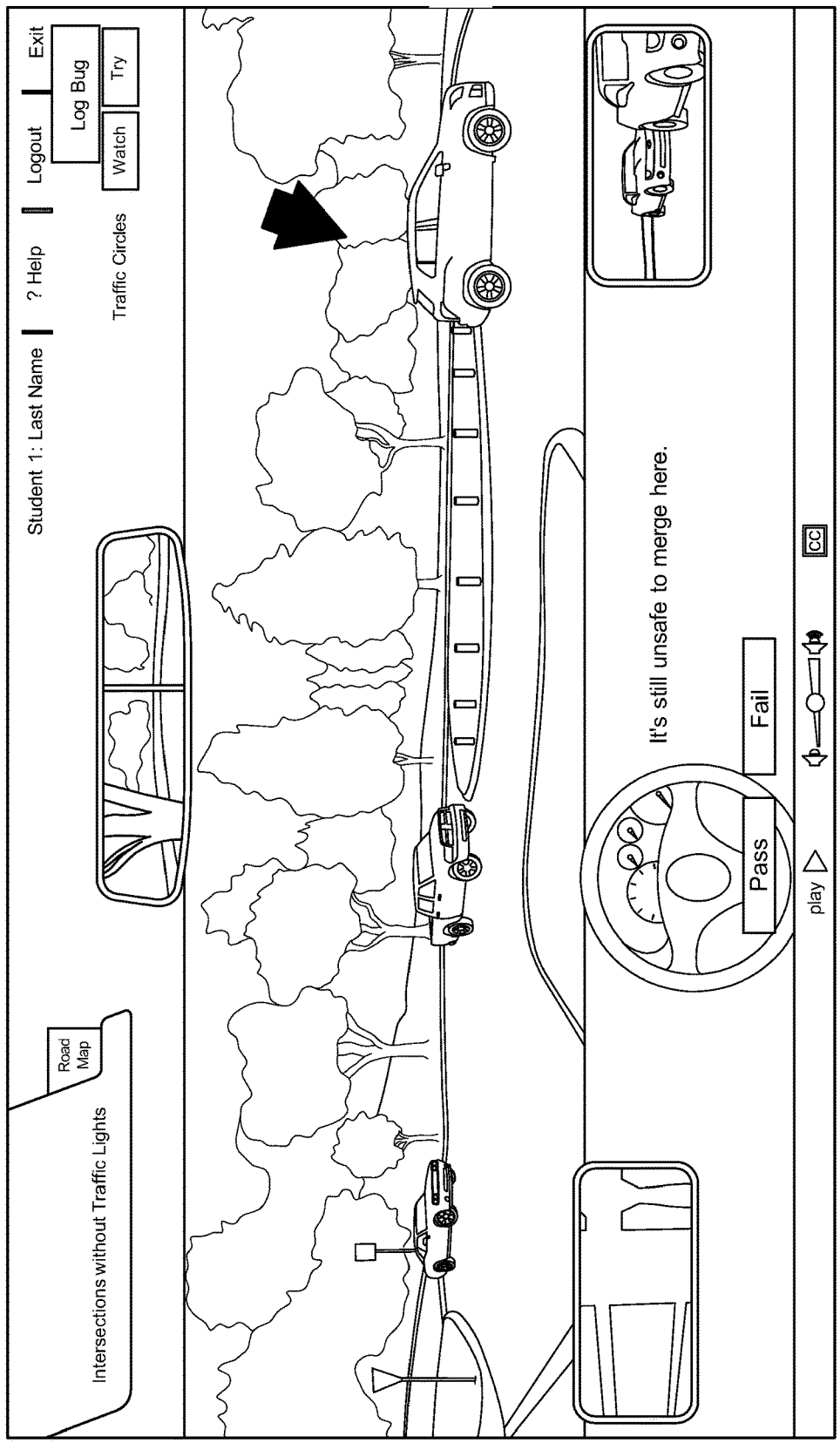
FIG. 8 is a screen shot taken from a round-about, only showing the result of an unsafe action.

FIG. 8 is a screen shot from a roundabout situation, which presents a particularly complex driving environment to navigate. As was the case for the uncontrolled intersection presentation, the result is shown in terms of the simulated action being unsafe, safe or risky actions, or the student having missed the merging opportunity. FIG. 8 demonstrates an unsafe action, as the roundabout has traffic entering from the left.

Figure 9:
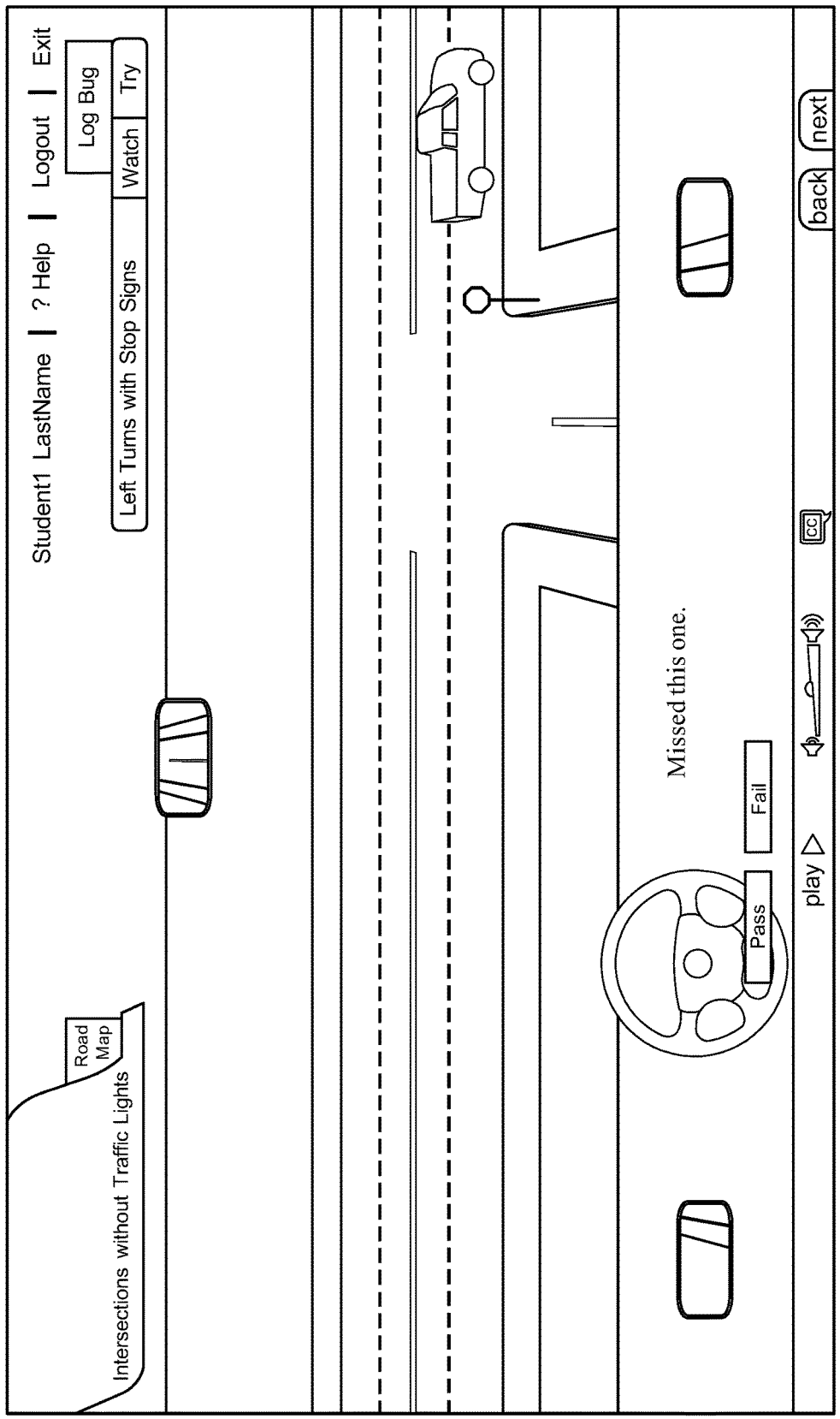
FIG. 9 is a screen shot taken from the same presentation as FIG. 4, as a missed opportunity.

Other simulated driving environments of particular concern to driver interacting with autonomous or semi-autonomous vehicles are similarly presented. For instance, a common gap analysis issue is negotiating the gap in traffic viewed while addressing a left hand turn across oncoming traffic at an intersection controlled by a stop light. For this purpose a modified version of the system can be employed with a reduced front view that only includes a forward camera recording stitched to a view recorded from a driver's side window, since only oncoming traffic from the left is at issue. In such a case, the forward view provides a view of about 130 degrees of the driving environment within the driver's forward and left view. FIG. 9 shows such a view, where the driver has missed a safe opportunity to enter the intersection and complete a left-hand turn.

Figure 10:
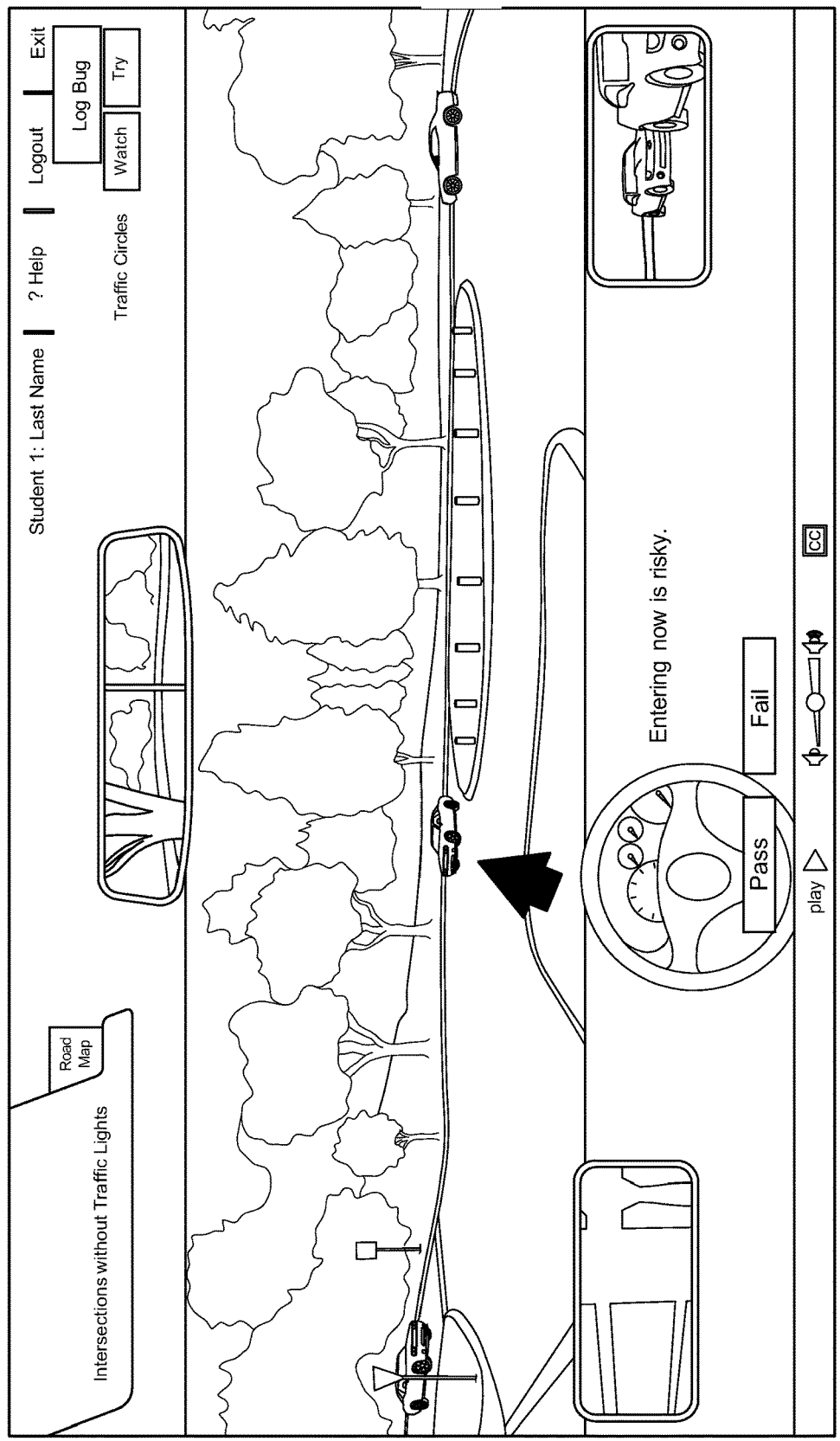
FIG. 10 is a similar presentation as shown in FIG. 4, only with the driving situation recorded from a roundabout, showing a risky action.

FIG. 10 is another view of the roundabout situation depicted in FIG. 8, only in this situation, the decision to enter is deemed risky, with the arrow used to identify the problematic car circling through the roundabout from the driver's left.

Figure 11:
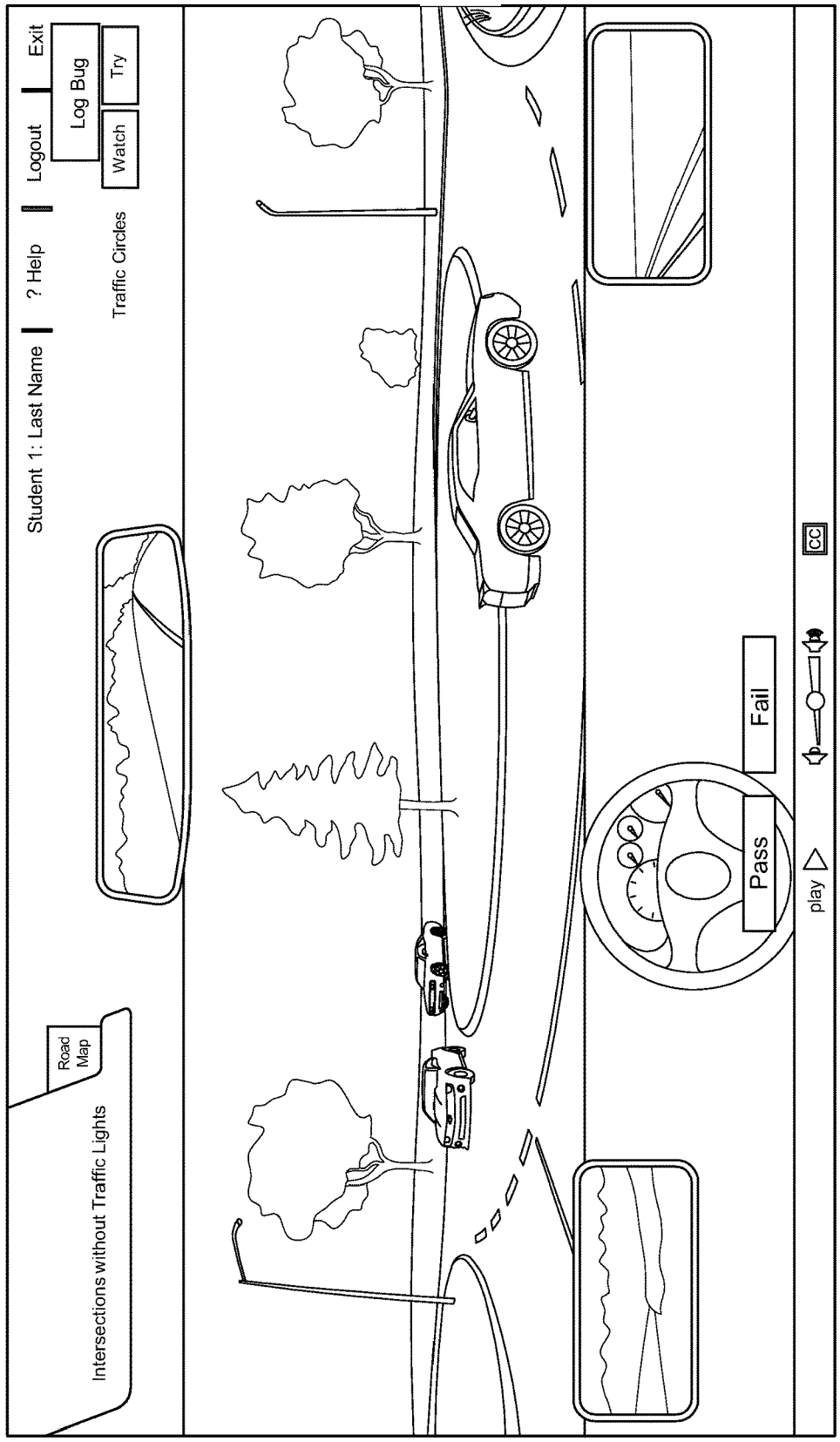
FIG. 11 is from the same presentation as shown in FIG. 8, only showing an unsafe action.

A great variety of driving situations can be provided to the driver, which varies in traffic speeds, densities, lighting, etc. FIG. 11 is a roundabout presentation that differs from that shown in FIG. 10, taken at a larger roundabout with faster speeds and more traffic than what is found in the circle in FIG. 10, and presenting a different level of challenge to the driver.

Figure 12:
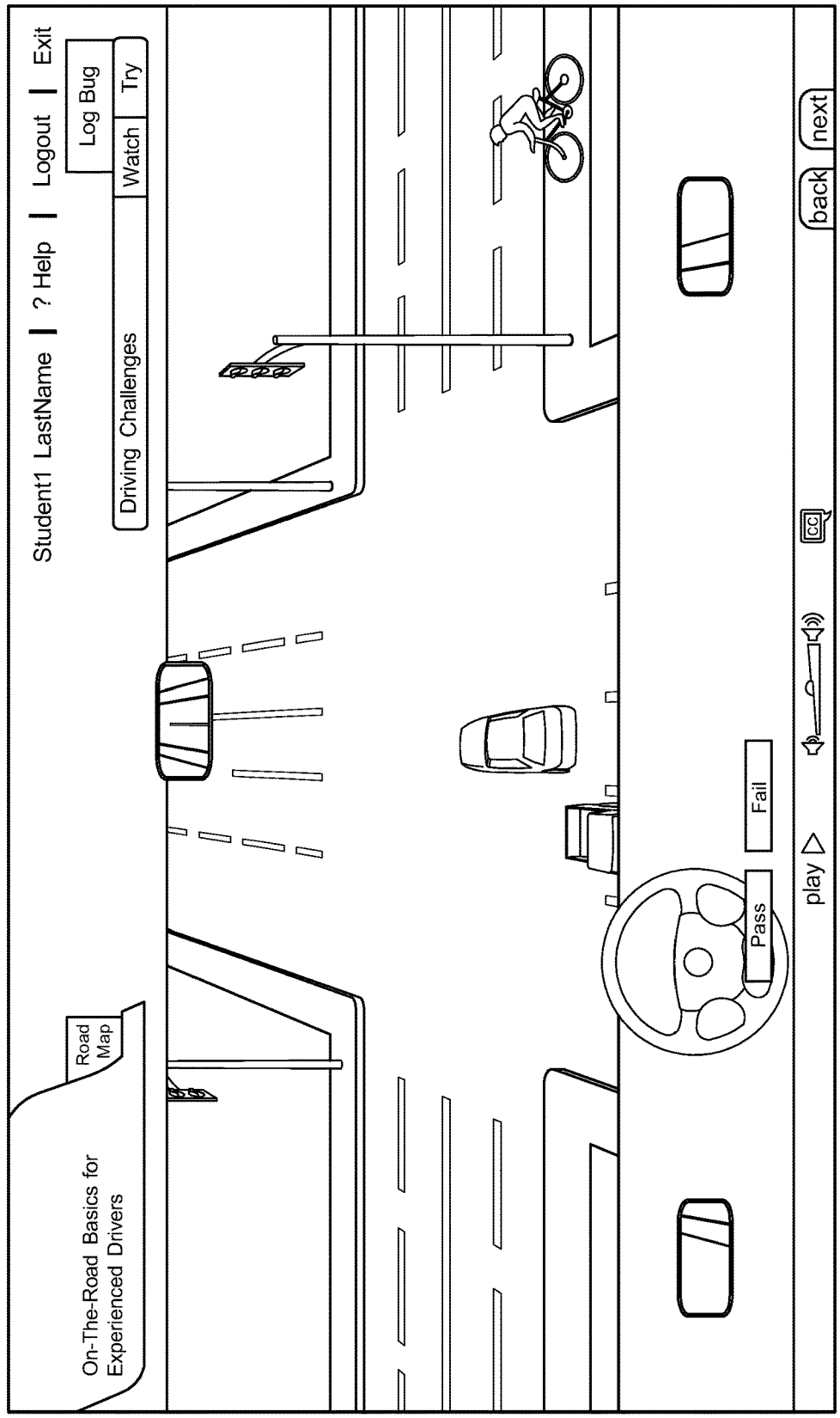
FIG. 12 is from a driving situation depicted in presentation for improving the skill of hazard detection.
Figure 13:
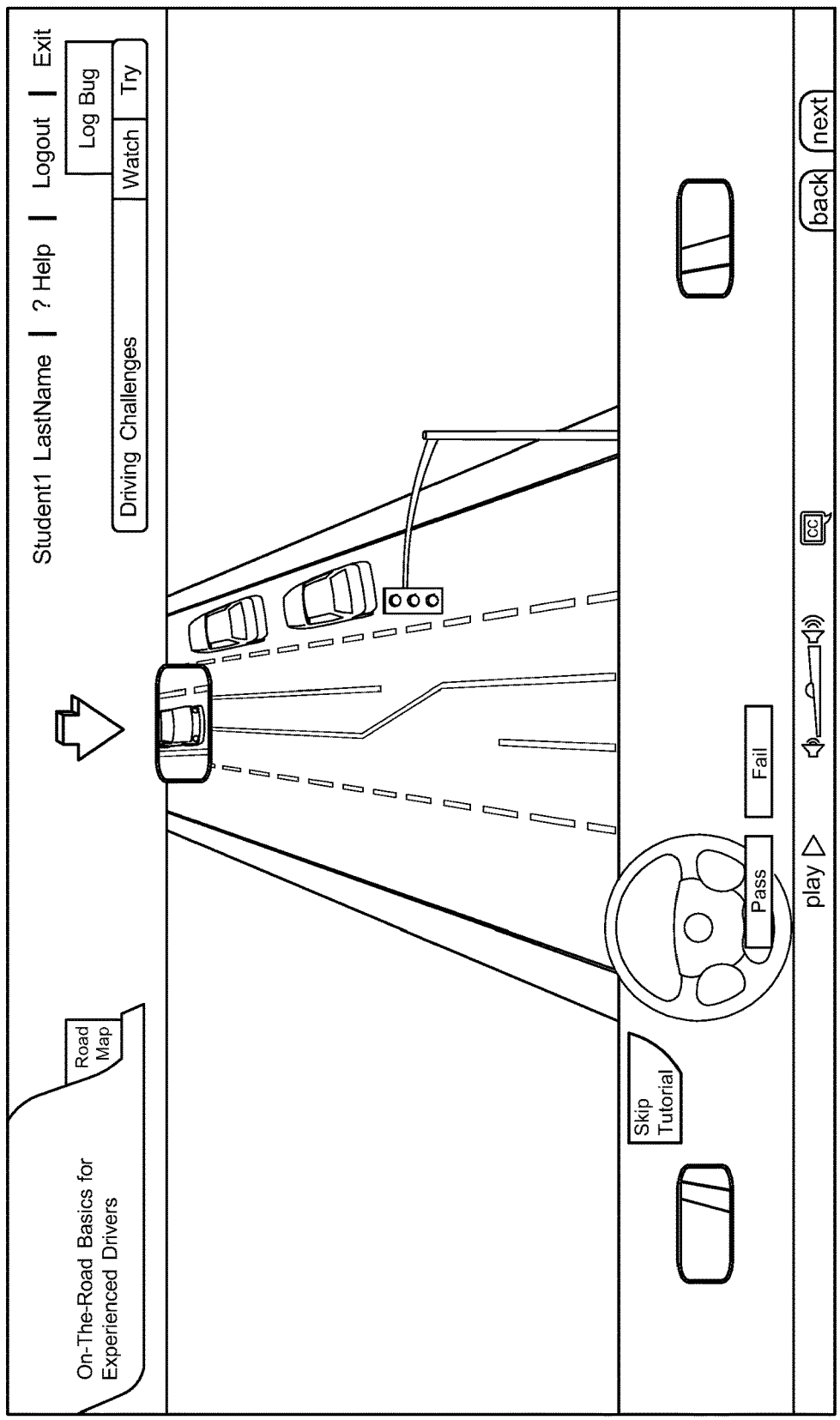
FIG. 13 shows a screen shot where the program presents a driving situation asking for a one object recall
Figure 14:
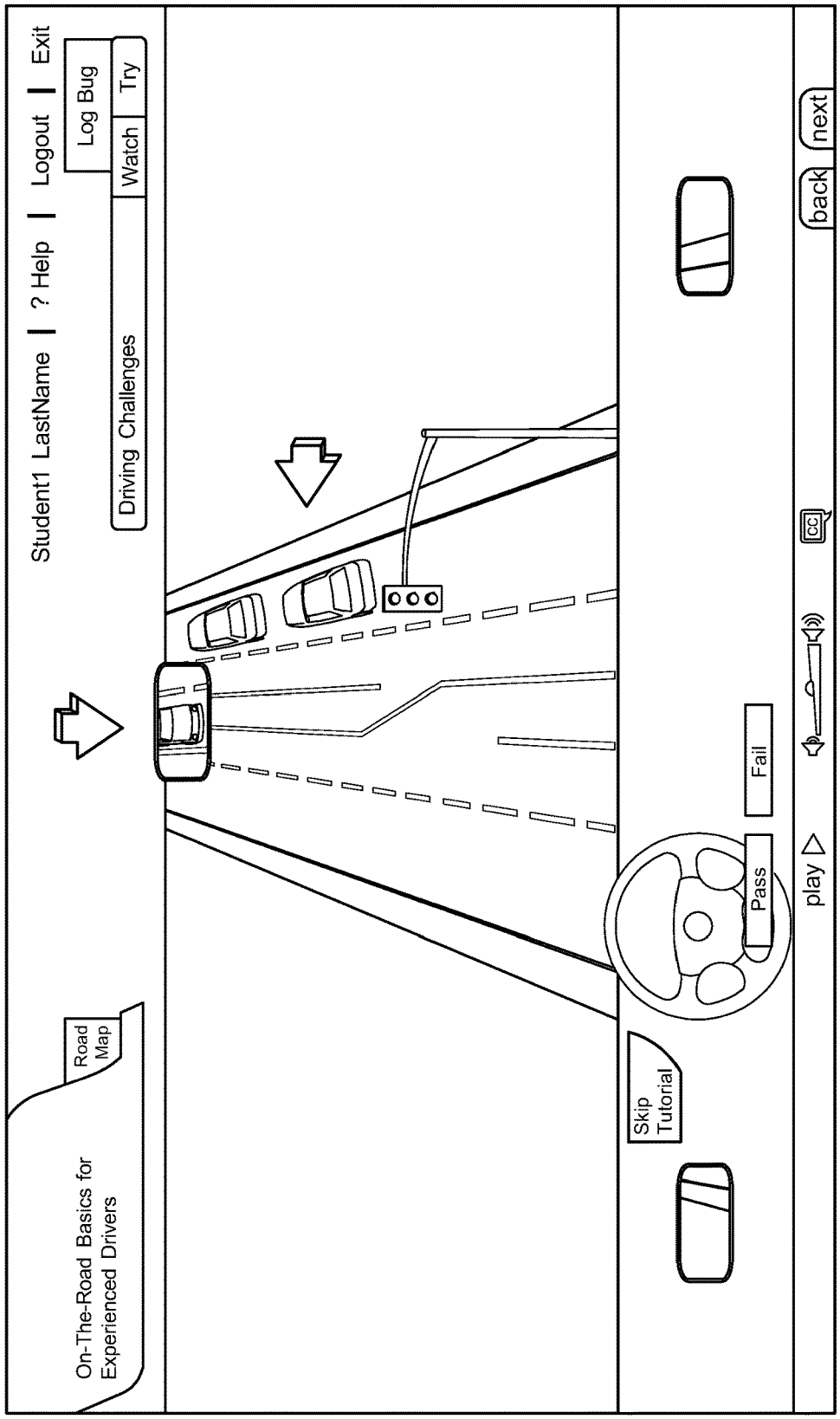
FIG. 14 is a driving situation calling for a two object recall

FIG. 12 is an example of a challenging driving environment that includes pedestrian and bicycle traffic at an intersection. A merge into an adjacent lane of traffic, or even onto the freeway, can be presented similarly to the other presentations. FIG. 13 provides an example of the use of the system as being particularly adapted in providing the student with an exercise in hazard detection. The screen show is taken from a presentation where driving hazards are tracked in a normal traffic flow. A truck hazard is identified in the shot shown in FIG. 13, with the arrow in the field showing the truck in the driver's rearview mirror. FIG. 14 is the same as FIG. 13, only identifying two hazards for the driver. In these types of simulations, the driver is expected to track and be able to locate the position of objects and hazards that are within the depicted driving environment.

Figure 15:
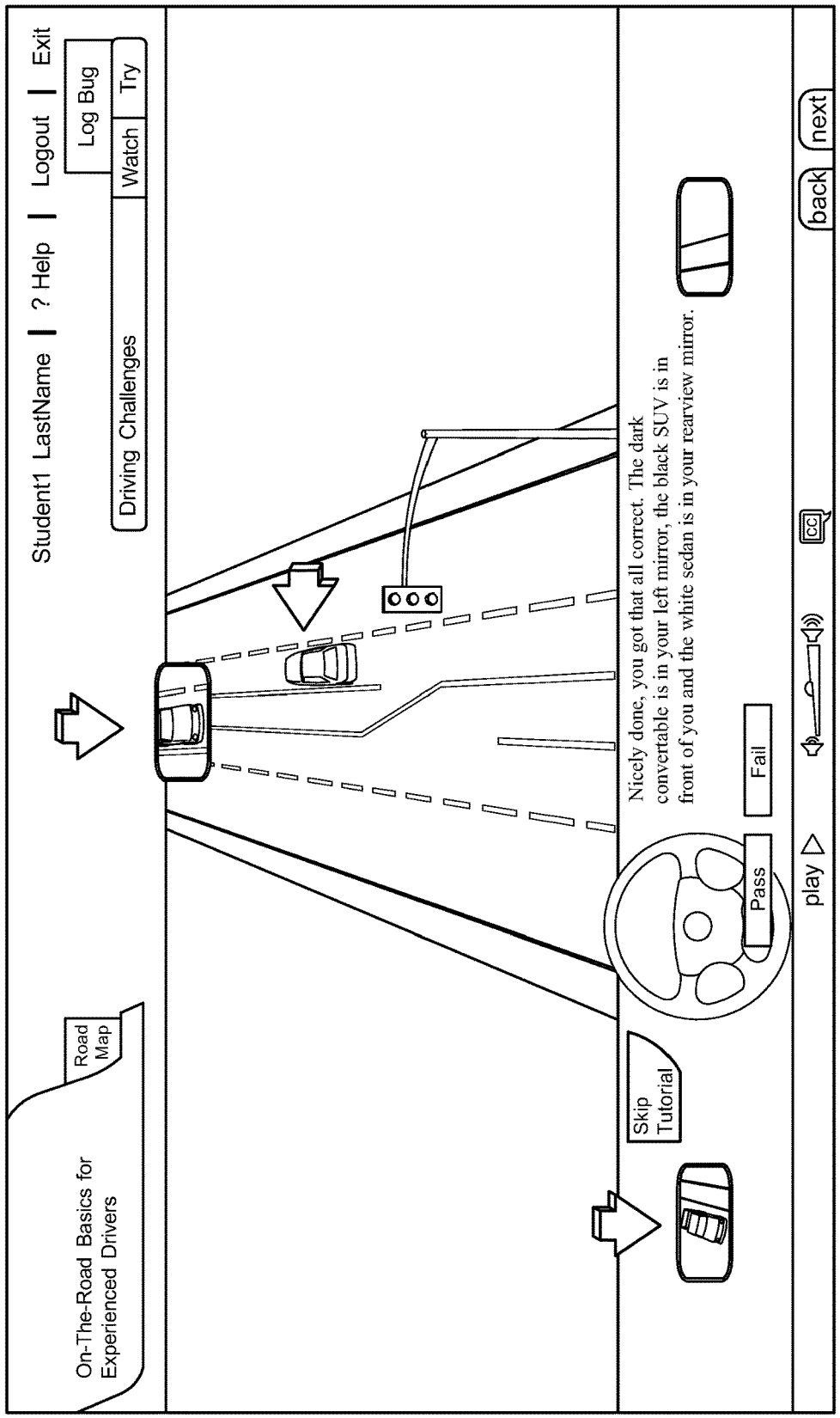
FIG. 15 is a driving situation calling for a three object recall

As show in FIG. 15, the hazard detection can be fairly sophisticated, and can be linked both to a general safe driving environment exercise, or in locating objects that are relevant to the decision to make a lane change. As seen in FIG. 15, the driver has correctly identified three objects in the driving environment (identified in the figure with arrows), which are also relevant to a decision to safely make a lane change of not.

Figure 16:
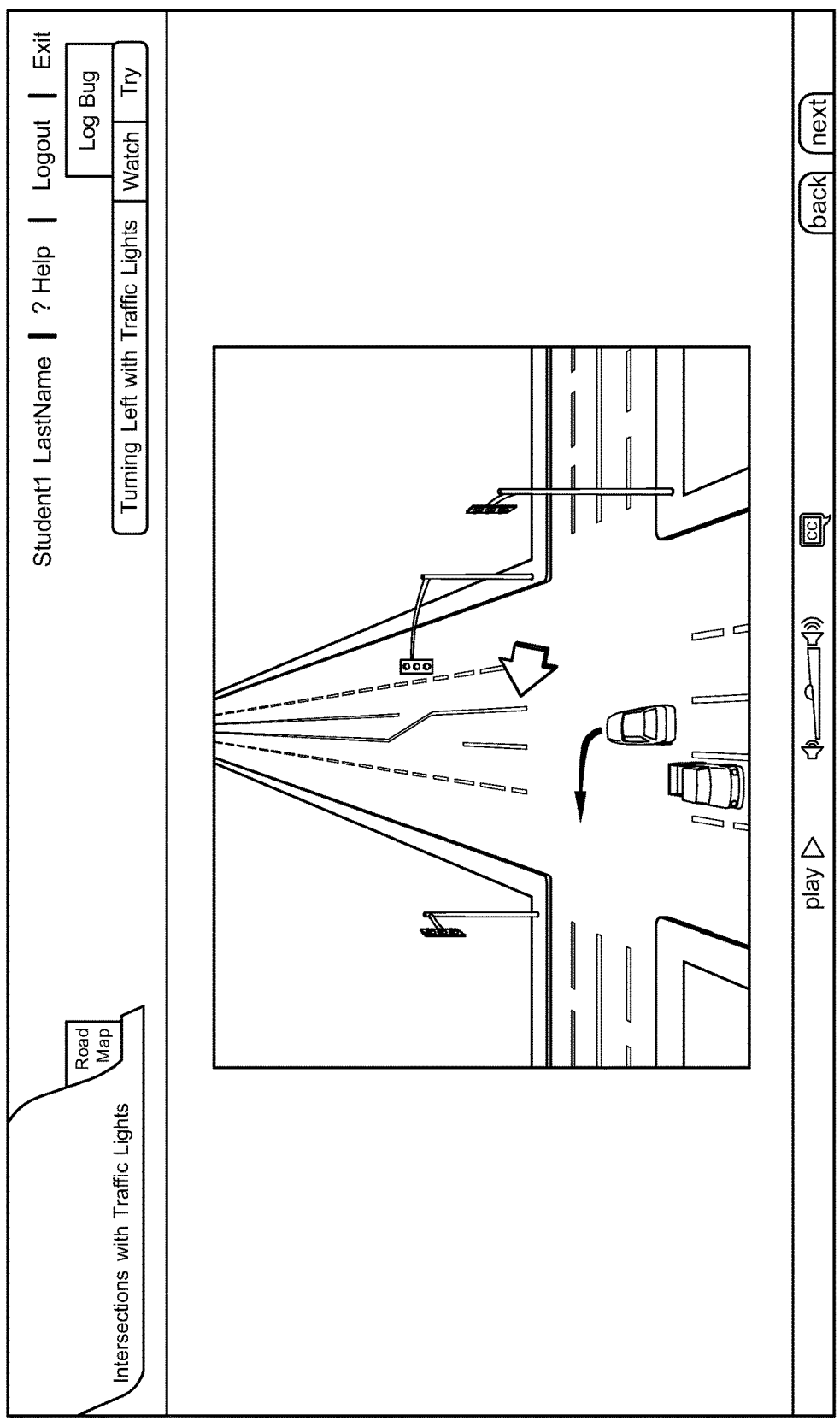
FIG. 16 is a screen shot of a module used to explain principles of safe, unsafe, and risky decisions at traffic lights according to one embodiment.
Figure 17:
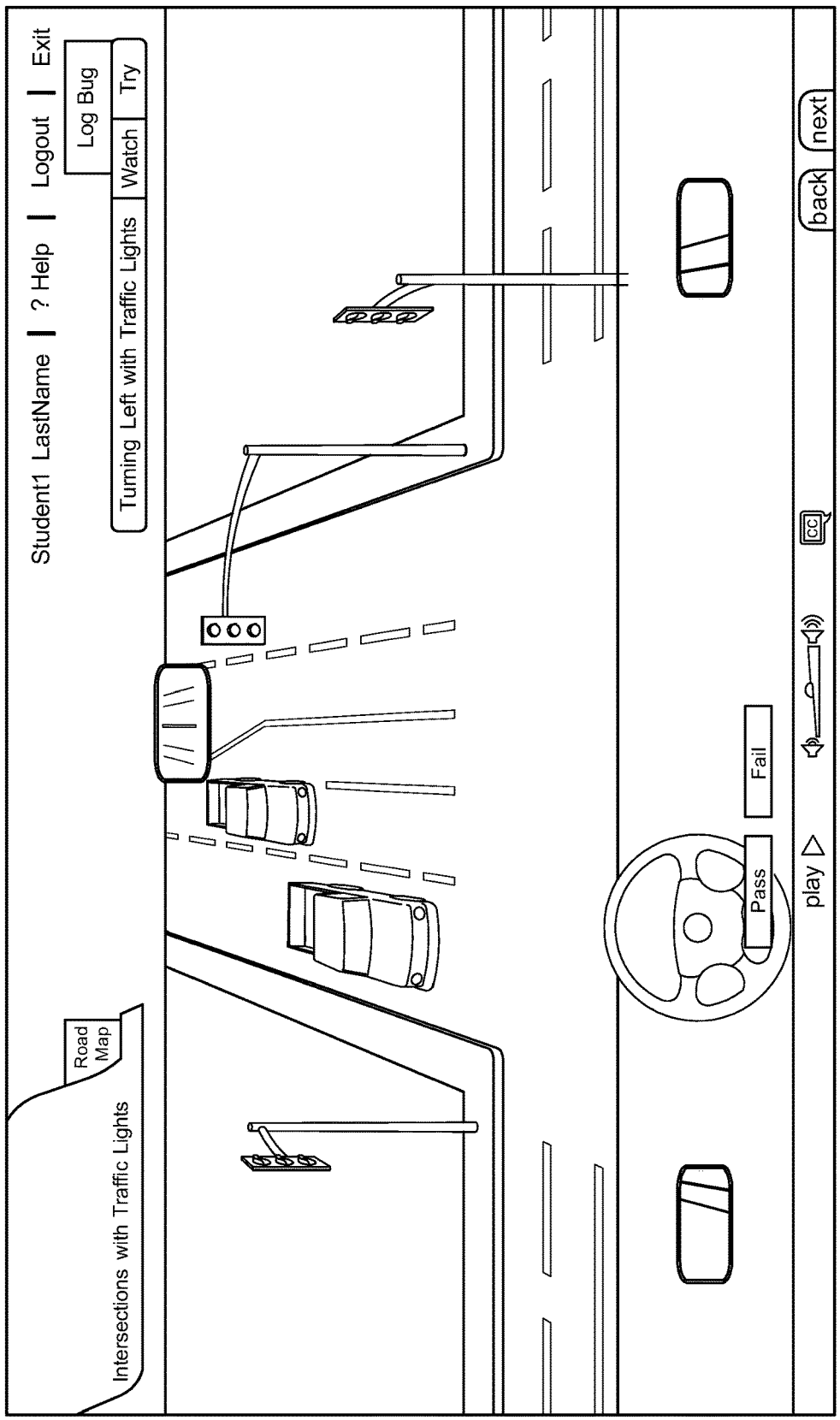
FIG. 17 is a screen shot of the driving environment presented to a driver attempting to make a left turn at a residential intersection according to one embodiment.
Figure 18:
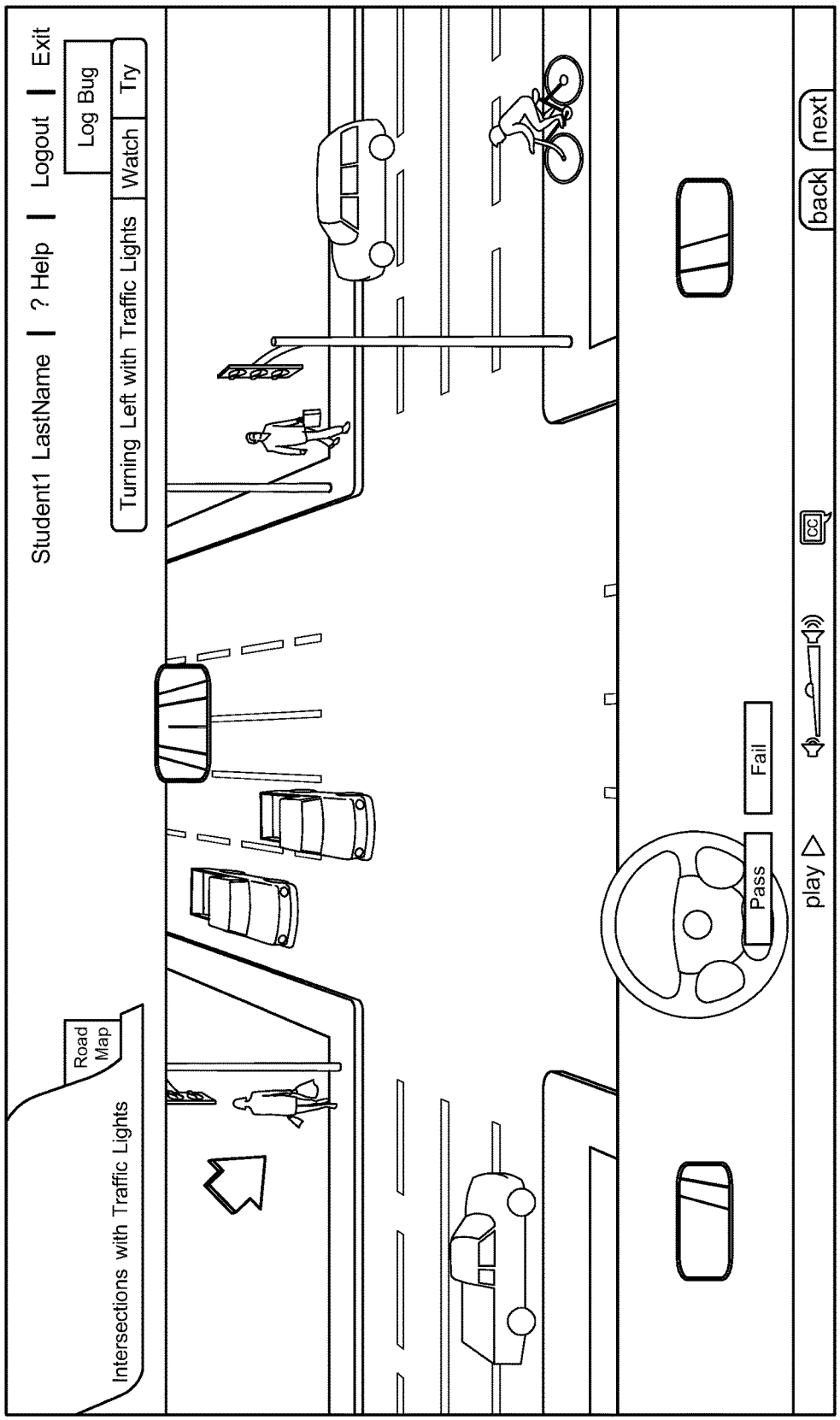
FIG. 18 is a screen shot of the driving environment presented to a driver attempting to make a left turn at a commercial intersection according to one embodiment.

FIGS. 16 through 18 show the applications of the system to the most difficult and dangerous of the driving situation faced by seniors, the left hand turn at a stop light across oncoming traffic. FIG. 16 is a module that is used to explain the principles of safe, unsafe and risky decisions at traffic lights.

In FIG. 17, the driving environment presented to the driver is a left hand turn at a traffic light in a residential area. In the environment two cars are passing through the intersection, with a gap following these two cars of some distance. The driver would have to make a decision to advance or not through the intersection at the coming gap. If the gap is less than 4 seconds, then the opportunity is considered risky. Even a safe gap can be deemed risky, if the driver hesitates in entering the intersection for a sufficient time to convert the safe distance to something less at the time of the decision.

FIG. 18 presents the left turn at a stop light environment at a commercial intersection, a generally busier and more challenging environment to test the driver. In FIG. 18, the arrow is shown identifying an additional hazard, namely, a pedestrian shopper crossing the intersection to the left.

Based on the responses to the training sessions, a training module of individualized and prescriptive instruction is developed for a particular driver, based on the diagnostic assessment and comprising at least one training lesson. Lessons presented to individual drivers are designed to aid that particular driver in the strengthening of particular driver skills or, in some cases, the development compensating abilities for the deficiencies noted in the assessment. The training sessions may include computer based training to supplement the development of skills in the areas of visual cognition, visual memory and visual recall.

As one part of the prescriptive instruction, the driver may be asked to repeat the initial training session, in order to assess rehabilitation of the driver's visual cognition, visual memory and visual recall abilities.

Information regarding successful completion of the training module can be provided to a designated third party, as evidence of the rehabilitation of the drivers skills. In one such aspect of this embodiment, a third party is selected from the group consisting of an insurance agency, a state motor vehicle agency, a police department, an automotive association and a rehabilitation center. In a further preferred embodiment, the third party is, for instance, an insurance company or agency that authorizes a discounted insurance rate for the driver in response to the evidence of rehabilitation.

In one application of the system, the information from the assessment is directed to the driver's insurance company. In the latter regard, a certification program demonstrating the completion by the driver of the tailored training regimen can be used to provide information on the successful education of the impaired driver, with training of ways to compensate and drive safely in spite of certain impairments associated with aging.

Thus, even where a driver has failed to recognize his or her own abilities, or where the fear of giving up driving altogether makes the resistant to assessment in another setting, the system provides a safe and friendly assessment with the option of a training system to advance the driving abilities. Because the system offers diagnostic and specialized training, it is possible to offer the driver an option to become trained and more proficient, in compensating for the impairments of aging, and not necessarily have to fear a permanent loss of driving ability and subsequent dependence on others for the necessities of life, or loss of social and leisure activities The system is also suitable for the many drivers that may wish to monitor themselves and gradually limit or stop driving as they feel certain driving situations have become safe. With computer based training (CBT) the assessment and training can be conducted on site, such as at a state motor vehicle department facility or physician's office, or the like, or accessed through the internet for home-based training. With home based training, interactive systems can be installed to monitor progress and report diagnostic test results to insurance agencies, motor vehicle departments, or other interested parties. With repeated tests, the improvement in driving abilities, or continued decline, can be monitored over time, so that both the extent of, and trend in, the impairment can be continuously assessed, and remedial actions taken as appropriate.

With the assessment and training method described herein, the question of whether and to what extent an impaired driver may be required give up the driving privilege can be answered privately, or only between the driver and limited family members or third parties of the seniors choosing.

Additionally, the system provides the opportunity for a training regimen tailored to the particular needs of a driver, and thus holds out the promise of eventual improvement and certification of safe driving skills. As one example, the National Highway Traffic Safety Administration suggests various ways that seniors can adapt to their changing abilities. If drivers often seem to suddenly stop in front of the senior, they are advised to pay extra attention to vehicles in front and maintain a safe distance between cars: one car length for every 10 miles per hour. If other drivers seem to be going especially fast to the senior, use the speed limit as a guide. The driver is urged to not feel pressured to drive unnecessarily fast, but to recognize that going too slowly can be just as dangerous. They are also urged to stay in the right-hand lane where they can.

As another example, they may be urged to stay in the middle lane when safe and in the right-hand lane when exiting freeways or turning right when they can.

If sharp turns are difficult for the driver to make, a recommendation is typically made to go as slowly as is needed and stay in the lane, using the signal and being sure it is off after completing the turn.

If highway driving gives the driver more trouble than he or she is used to, the driver is asked to remember to stay in the lane that's going closest to their own speed, and keep up with the rest of traffic as best they can. Avoiding traveling during rush hour is also recommended, as well as avoiding night time driving and bad weather conditions. Other recommendations include reducing distance traveled, and even making three right turns instead of turning left, if needed.

Aspects of the present invention may be implemented using hardware, software, firmware, or a combination thereof and may be implemented in one or more computer systems or other processing systems.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

The invention claimed is:

1. A driving simulator for assessing and improving driving skills comprising:
a computerized audio/visual device programmed to:
display an interactive driving simulation presented through four active visual zones from a driver's-seat perspective comprising (1) a driver's forward view, (2) a rear mirror view, (3) a left side mirror view, and (4) a right side mirror view, wherein the driver's forward view includes a combined representation of a driver's side window view, a windshield view, and a passenger's window view, and wherein the rear mirror view, left side mirror view, and right side mirror view each simultaneously depict a scene occurring simultaneously with the driver's forward view;
display a traffic hazard in one of the four active visual zones;
receive an input from a user of the driving simulator identifying a location in one of the four active visual zones;
determine if the location corresponds to the traffic hazard; and
determine a response time between the display of the traffic hazard and the receipt of the input from the user.

2. The driving simulator of claim 1 wherein the computerized audio/visual device is programmed to:
record the response time;
create a database for storing the response time; and
analyze the response time to develop a diagnostic assessment of impairments in visual cognition, visual memory, or visual recall abilities.

3. The driving-simulator of claim 1 wherein the interactive driving simulation is presented using digital frame based technology.

4. The driving-simulator of claim 1 wherein the forward view provides a view of at least about 180 degrees.

5. The driving-simulator of claim 1 wherein the computerized audio/visual device is programmed to assess visual search skills, visual memory, and visual recall.

6. A computerized audio/visual driving simulator method for assessing and improving driving skills comprising:
displaying an interactive driving simulation presented through four active visual zones from a driver's-seat perspective comprising (1) a driver's forward view, (2) a rear mirror view, (3) a left side mirror view, and (4) a right side mirror view, wherein the driver's forward view includes a combined representation of a driver's side window view, a windshield view, and a passenger's window view, and wherein the rear mirror view, left side mirror view, and right side mirror view each simultaneously depict a scene occurring simultaneously with the driver's forward view;

displaying a traffic hazard in one of the four active visual zones;

receiving an input from a user of the driving simulator identifying a location in one of the four active visual zones;

determining if the location corresponds to the traffic hazard; and determining a response time between the display of the traffic hazard and the receipt of the input from the user.

7. The method of claim 6 further comprising the steps of:
recording the response time;
creating a database for storing the response time;
storing the response time; and
analyzing the response time to develop a diagnostic assessment of impairments in the visual cognition, visual memory, and/or visual recall abilities.

8. The method of claim 6 wherein the interactive driving simulation is presented using digital frame based technology.

9. The method of claim 6 comprising assessing visual search skills, visual memory, and visual recall using the response and response time.

10. The method of claim 6 wherein the forward view provides a view of at least about 180 degrees.

11. A computer-implemented method for assessing and improving driving skills of a driver comprising:

displaying an interactive driving simulation presented through four active visual zones from a driver's-seat perspective comprising (1) a driver's forward view, (2) a rear mirror view, (3) a left side mirror view, and (4) a right side mirror view, wherein the driver's forward view includes a combined representation of a driver's side window view, a windshield view, and a passenger's window view, and wherein the rear mirror view, left side mirror view, and right side mirror view each simultaneously depict a scene occurring simultaneously with the driver's forward view;

displaying a traffic hazard in one of the four active visual zones;

receiving an input from a user of the driving simulator identifying a location in one of the four active visual zones;

determining if the location corresponds to the traffic hazard; and determining a response time between the display of the traffic hazard and the receipt of the input from the user.

12. The method of claim 11 further comprising:
recording whether the driver's identification was correct and the driver's response time;
creating a database for storing whether the driver's identification was correct and the driver's response time;
storing whether the driver's identification was correct and the driver's response time; and analyzing whether the driver's identification was correct and the driver's response time to develop a diagnostic assessment of impairments in the visual cognition, visual memory, and visual recall abilities of the driver.

* * * * *